United States Patent
Barth et al.

(10) Patent No.: US 9,100,206 B1
(45) Date of Patent: Aug. 4, 2015

(54) SEAMLESS ARCHITECTURE FOR CABLE ACCESS NETWORKS

(75) Inventors: Colby Barth, Collegeville, PA (US);
David Ward, Los Gatos, CA (US);
Maciek Konstantynowicz, Haddenham (GB)

(73) Assignee: Juniper Networks, Inc., Sunnyvale, CA (US)

( * ) Notice: Subject to any disclaimer, the term of this patent is extended or adjusted under 35 U.S.C. 154(b) by 203 days.

(21) Appl. No.: 13/436,418

(22) Filed: Mar. 30, 2012

(51) Int. Cl.
*H04L 12/28* (2006.01)
*H04L 29/06* (2006.01)

(52) U.S. Cl.
CPC ....... *H04L 12/2801* (2013.01); *H04L 29/06176* (2013.01)

(58) Field of Classification Search
CPC .................. H04L 12/2801; H04L 29/06176
USPC .................................. 370/241, 360, 463, 389
See application file for complete search history.

(56) References Cited

U.S. PATENT DOCUMENTS

| | | | | |
|---|---|---|---|---|
| 6,466,986 | B1* | 10/2002 | Sawyer et al. ................ | 709/245 |
| 7,184,437 | B1 | 2/2007 | Cole et al. | |
| 7,602,730 | B1* | 10/2009 | Hou ............................... | 370/252 |
| 7,724,763 | B2* | 5/2010 | Limb et al. .................... | 370/443 |
| 8,005,083 | B1* | 8/2011 | Diep ............................. | 370/389 |
| 8,335,917 | B2* | 12/2012 | Ford et al. ..................... | 713/153 |
| 8,422,502 | B1* | 4/2013 | Alaettinoglu et al. ........ | 370/392 |
| 2003/0058794 | A1* | 3/2003 | Pantelias et al. .............. | 370/230 |
| 2003/0061415 | A1* | 3/2003 | Horton et al. .................. | 710/30 |
| 2004/0184404 | A1* | 9/2004 | Carpenter et al. ............ | 370/235 |
| 2004/0260553 | A1* | 12/2004 | Niemi ............................ | 704/270 |
| 2004/0261116 | A1* | 12/2004 | Mckeown et al. ............ | 725/109 |
| 2005/0008009 | A1* | 1/2005 | Chen et al. ..................... | 370/360 |
| 2006/0159100 | A1* | 7/2006 | Droms et al. ............... | 370/395.2 |
| 2007/0047449 | A1* | 3/2007 | Berger et al. ................. | 370/241 |
| 2007/0076717 | A1* | 4/2007 | Limb et al. ..................... | 370/390 |
| 2008/0044181 | A1 | 2/2008 | Sindhu | |
| 2008/0298277 | A1* | 12/2008 | Singh et al. ................... | 370/255 |
| 2009/0070800 | A1* | 3/2009 | Gould et al. .................... | 725/25 |
| 2009/0327488 | A1* | 12/2009 | Sampat et al. ................ | 709/224 |
| 2010/0043067 | A1* | 2/2010 | Varadhan et al. .............. | 726/13 |
| 2010/0177784 | A1* | 7/2010 | Asati et al. ..................... | 370/463 |

(Continued)

OTHER PUBLICATIONS

U.S. Appl. No. 12/182,619, by Jerome P. Moisand, filed Jul. 30, 2008.

(Continued)

*Primary Examiner* — Parth Patel
(74) *Attorney, Agent, or Firm* — Shumaker & Sieffert, P.A.

(57) ABSTRACT

In general techniques are described for applying differentiated services with a customer-aware network device. A network device comprising a control unit and an interface may implement the techniques. The interface receives a network packet that is associated with first and second labels. The first label uniquely identifies a Cable Modem Termination System (CMTS) within a plurality of CMTSs. The second label uniquely identifies one of a plurality of CPE devices coupled to the CMTS. The control unit determines at least one subscriber-specific service associated with the one of the plurality of CPE devices based at least in part on the first and second labels associated with the labeled network packet. The at least one subscriber-specific service comprises a service associated with the one of the plurality of CPE devices. The control unit applies the at least one subscriber-specific service to the labeled network packet received from the CMTS.

44 Claims, 5 Drawing Sheets

(56) References Cited

U.S. PATENT DOCUMENTS

2011/0142042 A1* 6/2011 Field ............................ 370/390
2011/0271311 A1* 11/2011 Berger et al. ................. 725/100
2012/0051216 A1* 3/2012 Zhang et al. .................. 370/230

OTHER PUBLICATIONS

International Telecommunication Union, "Third-generation transmission systems for interactive cable television services—IP cable modems: MAC and Upper Layer protocols," vol. 1: Core Recommendation, Recommendation ITU-T J.222.2, Jul. 29, 2007, 435 pp.
International Telecommunication Union, "Third-generation transmission systems for interactive cable television services—IP cable modems: MAC and Upper Layer protocols," vol. 2: Annexes and appendices, Recommendation ITU-T J.222.2, Jul. 29, 2007, 263 pp.
Martini et al., "Encapsulation Methods for Transport of Ethernet over MPLS Networks," Network Working Group, RFC 4448, Apr. 2006, 25 pp.

* cited by examiner

SEAMLESS ARCHITECTURE FOR CABLE ACCESS NETWORKS

TECHNICAL FIELD

The invention relates to computer networks and, more particularly, delivery of data services over cable networks.

BACKGROUND

A cable network typically comprises an edge network that couples customer devices to a public network, such as the Internet, via coaxial or other cable. The cable network typically includes a network device referred to as a Cable Modem Termination System (CMTS) to facilitate this access via the coaxial cable. Coupled to one end of the coaxial cable, the CMTS usually resides in a Head-end and manages cable modems (CMs) coupled to the opposite end of the coaxial cable that reside within the customer's premises. Both the CMTS and the CMs convert data, usually received in packet form, into Radio Frequency (RF) signals for delivery over the coaxial cable, whereupon at either end of the coaxial cable, the CMTS or CMs reconvert the RF signal back into the data packets.

The customers may couple various devices to the CM, which originate the data packets for delivery upstream from the CM to the CMTS via the coaxial cable. In this manner, the customer devices may interface with the public network via the cable network to download and/or upload data or content. The customer devices, which may be referred to herein as Customer Premises Equipment (CPE), may include, to provide a few examples, telephones, routers, switches, residential gateways, set-top boxes, fixed mobile convergence products, home networking adaptors and internet access gateways.

Usually, each customer subscribes to and pays for, as part of the cable data service, a particular level of service, such as a set amount of bandwidth. To provide this level of service, the CMTS may provide, in accordance with a standard referred to as Data Over Cable System Interface Specification (DOCSIS), all subscriber or customer management functions by which to register CMs for operation within the cable network at the corresponding purchased level of service. These customer management functions may include maintaining CM service profiles for each CM that indicate, in part, the level of service provided to traffic originating from a corresponding CM. The CMTS may therefore be considered to "own" this customer management functionality in that typically no other device in a cable access network is aware of individual customers.

As a result of being the only network device that is aware of individual customers, the CMTS may be adapted to provide new or emerging services that depend on subscriber or customer awareness. Typically, the CMTS cannot be upgraded to provide these new customer aware services and the cable network operations have to replace the currently deployed CMTS and/or CMs with a CMTS and/or CMs that support these new services. Having to replace the currently deployed CMTS and/or CMs in order to deploy these new customer aware services is typically expensive, requiring a large capital expenditure (CAPEX). Due to the expense, deployment of these customer aware services may be slow, potentially hampering customer satisfaction in that competing types of access networks may more readily deploy these types of services.

SUMMARY

In general, techniques are described for applying differentiated services with a customer-aware network device, such as a layer three (L3) service router deployed within a cable network, that may not require the large capital expenditures (CAPEX) currently associated in cable access networks with deploying these types of differentiated services. The techniques may advantageously provide for modular hardware such that subscriber management services and layer-3 routing functionality are offloaded from the CMTS to the service router. In operation, the CMTS may perform all DOCSIS functionality but forward the packets to a service router or other network devices positioned between the CMTSs of a cable access network and a public network (such as the Internet) for application of differentiated services. Because these routers do not implement DOCSIS, the routers may more readily be adapted to provide new or emerging differentiated services that depend on customer awareness, as the routers do not have to work through the DOCSIS standards body before offering these new or emerging services. Consequently, the techniques may provide for a seamless network architecture in which the CMTS provides DOCSIS functionality while the service router provides the differentiated services, offloading these services from having to be performed by the CMTS. In this way, the service router may be quickly adapted to offer the new and emerging services without having to replace CMTSs with upgraded CMTSs, potentially reducing CAPEX, while also promoting rapid service deployment in that the service routers do not have to seek approval from the DOCSIS standards body before deploying these services.

In one example, a method includes receiving, with a layer three (L3) packet-based router coupled to a Cable Modem Termination System (CMTS) that is positioned between a Cable Modem (CM) and the L3 packet-based router, a network packet that is associated with a first label and a second label. The first label uniquely identifies the CMTS within a plurality of CMTSs coupled to the L3 packet based-router, wherein the second label uniquely identifies one of a plurality of CPE devices coupled to the CMTS. The method also includes determining, by the L3 packet-based router, at least one subscriber-specific service associated with the one of the plurality of CPE devices based at least in part on the first and second labels associated with the labeled network packet. The at least one subscriber-specific service comprises a service associated with the one of the plurality of CPE devices. The method also includes applying, by the L3 packet-based router, the at least one subscriber-specific service to the labeled network packet received from the CMTS.

In one example, a network device includes a control unit having one or more hardware-based microprocessors. The network device also includes an interface that receives, from a Cable Modem Termination System (CMTS) that is positioned between a Cable Modem (CM) and the network device, a network packet that is associated with a first label and a second label. The first label uniquely identifies the CMTS within a plurality of CMTSs coupled to the network device. The second label uniquely identifies one of a plurality of CPE devices coupled to the CMTS. The network device also includes a service module executable by the microprocessors. The service module determines, by the network device, at least one subscriber-specific service associated with the one of the plurality of CPE devices based at least in part on the first and second labels associated with the labeled network packet. The at least one subscriber-specific service comprises a service associated with the one of the plurality of CPE devices. The service module applies the at least one subscriber-specific service to the labeled network packet received from the CMTS.

In one example, a non-transitory computer-readable medium includes instructions that, when executed, cause one or more processors of a layer three (L3) packet-based router to receive, with the L3 packet-based router coupled to a Cable Modem Termination System (CMTS) that is positioned between a Cable Modem (CM) and the L3 packet-based router, a network packet that is associated with a first label and a second label. The first label uniquely identifies the CMTS within a plurality of CMTSs coupled to the L3 packet based-router. The second label uniquely identifies one of a plurality of CPE devices coupled to the CMTS. The non-transitory computer-readable medium also includes instructions that, when executed, cause one or more processors of the layer three (L3) packet-based router to determine at least one subscriber-specific service associated with the one of the plurality of CPE devices based at least in part on the first and second labels associated with the labeled network packet. The at least one subscriber-specific service comprises a service associated with the one of the plurality of CPE devices. The non-transitory computer-readable medium also includes instructions that, when executed, cause one or more processors of the layer three (L3) packet-based router to apply the at least one subscriber-specific service to the labeled network packet received from the CMTS.

In one example, a method includes receiving, with a Cable Modem Termination System (CMTS) positioned between a Cable Modem (CM) and a layer three (L3) packet-based router, a Data Over Cable Service Interface Specification (DOCSIS) encapsulated packet from a Customer Premise Equipment (CPE) device coupled to the CM. The DOCSIS-encapsulated packet includes a DOCSIS header that encapsulates a network packet. The method also includes processing the DOCSIS-encapsulated packet, with the CMTS, to decapsulate the DOCSIS header from the network packet. The method further includes determining, with the CMTS, a first label that uniquely identifies the CMTS within a plurality of CMTSs coupled to the L3 packet-based router. The method also includes determining, with the CMTS, a second label that is associated the one of the plurality of CPE devices and uniquely identifies the one of the plurality of CPE devices within a plurality of CPE device coupled to the CMTS. The method further includes associating, with the CMTS, the first label and the second label with the decapsulated network packet to generate a labeled network packet. The method also includes forwarding, with the CMTS, the labeled network packet to the L3 packet-based router in accordance with the first label and the second label, such that the L3 packet-based router is capable of applying at least one subscriber-specific service to the labeled network packet based at least in part on the first label and the second label.

In one example, a Cable Modem Termination System (CMTS) includes a control unit having one or more hardware-based microprocessors. The CMTS also includes an interface that receives a Data Over Cable Service Interface Specification (DOCSIS) encapsulated packet from a Customer Premise Equipment (CPE) device coupled to the CM. The DOCSIS-encapsulated packet includes a DOCSIS header that encapsulates a network packet. The CMTS is positioned between a Cable Modem (CM) and a layer three (L3) packet-based router. The CMTS also includes a multiplexing module that processes the DOCSIS-encapsulated packet to decapsulate the DOCSIS header from the network packet. The CMTS also includes a label module that determines a first label that uniquely identifies the CMTS within a plurality of CMTSs coupled to the L3 packet-based router. The label module determines a second label that is associated the one of the plurality of CPE devices and uniquely identifies the one of the plurality of CPE devices within a plurality of CPE device coupled to the CMTS. The label module associates the first label and the second label with the decapsulated network packet to generate a labeled network packet. The CMTS also includes a forwarding engine that forwards the labeled network packet to the L3 packet-based router in accordance with the first label and the second label, such that the L3 packet-based router is capable of applying at least one subscriber-specific service to the labeled network packet based at least in part on the first label and the second label.

In one example, a non-transitory computer-readable medium includes instructions that, when executed, cause one or more processors of a Cable Modem Termination System (CMTS) to receive a Data Over Cable Service Interface Specification (DOCSIS) encapsulated packet from a Customer Premise Equipment (CPE) device coupled to the CM. The DOCSIS-encapsulated packet includes a DOCSIS header that encapsulates a network packet. The CMTS is positioned between a Cable Modem (CM) and a layer three (L3) packet-based router. The non-transitory computer-readable medium also includes instructions that, when executed, cause one or more processors of the CMTS to process the DOCSIS-encapsulated packet to decapsulate the DOCSIS header from the network packet. The non-transitory computer-readable medium also includes instructions that, when executed, cause one or more processors of the CMTS to determine a first label that uniquely identifies the CMTS within a plurality of CMTSs coupled to the L3 packet-based router. The non-transitory computer-readable medium also includes instructions that, when executed, cause one or more processors of the CMTS to determine a second label that is associated the one of the plurality of CPE devices and uniquely identifies the one of the plurality of CPE devices within a plurality of CPE device coupled to the CMTS. The non-transitory computer-readable medium also includes instructions that, when executed, cause one or more processors of the CMTS to associate the first label and the second label with the decapsulated network packet to generate a labeled network packet. The non-transitory computer-readable medium also includes instructions that, when executed, cause one or more processors of the CMTS to forward the labeled network packet to the L3 packet-based router in accordance with the first label and the second label, such that the L3 packet-based router is capable of applying at least one subscriber-specific service to the labeled network packet based at least in part on the first label and the second label.

The details of one or more embodiments of the techniques described in this disclosure are set forth in the accompanying drawings and the description below. Other features, objects, and advantages of these techniques will be apparent from the description and drawings, and from the claims.

DETAILED DESCRIPTION

Figure 1:
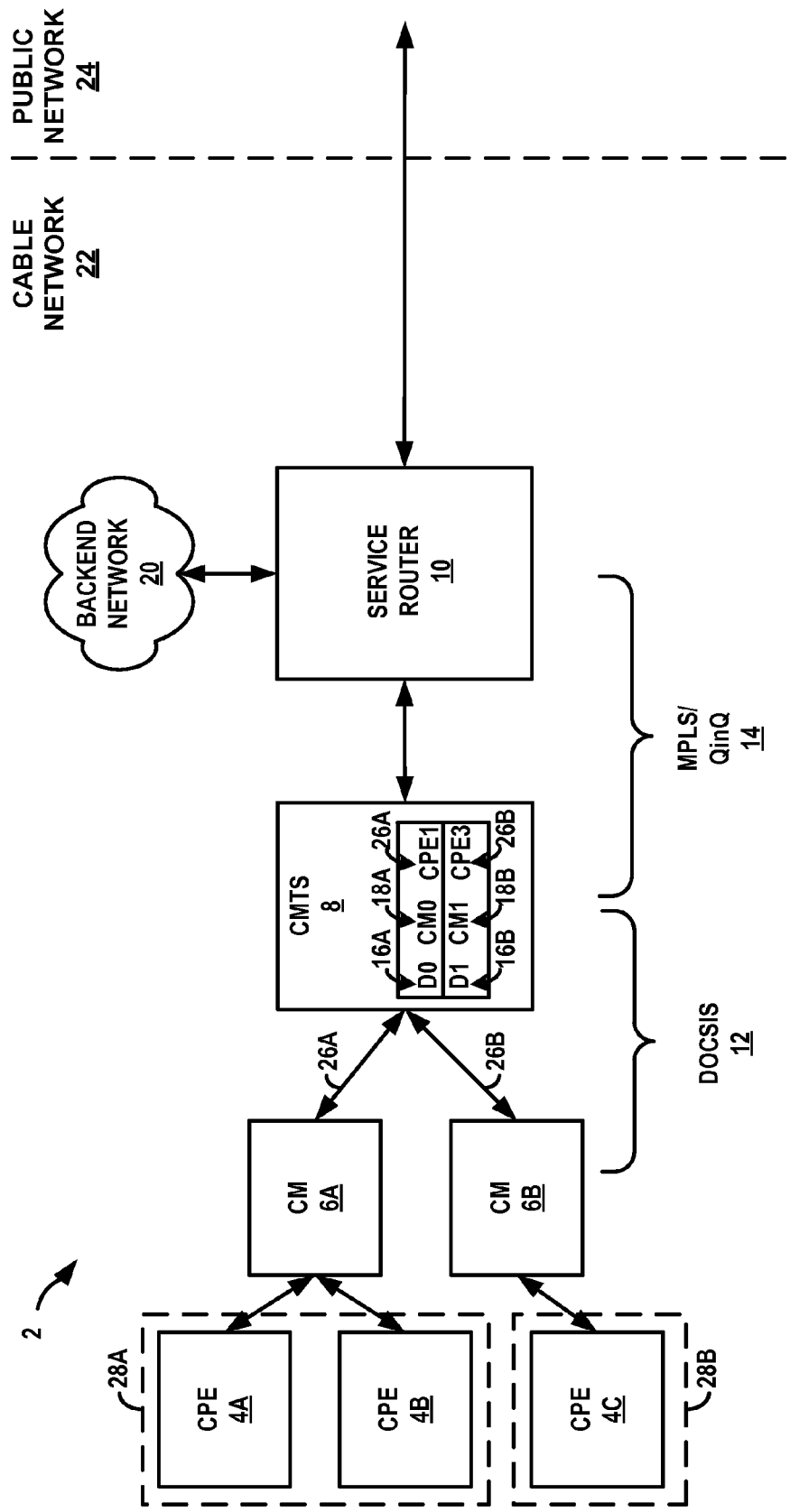
FIG. 1 is a block diagram illustrating an exemplary network system in which a service router applies services on a per-subscriber basis, in accordance with the techniques described in this disclosure.

FIG. 1 is a block diagram illustrating an exemplary network system 2 in which a service router 10 applies services on a per-subscriber basis in accordance with the techniques described herein. Network system 2 includes a cable network 22 that provides data connectivity to a public network 24. Cable network 22 includes a service router 10, a Cable Modem Termination System 8 ("CMTS 8") and a backend network 20, where service router 10 is positioned between CMTS 8 and backend network 20. While described in this disclosure with respect to a service router 10, the techniques may be implemented by any network device capable of applying services to network traffic within a cable network.

While not shown in FIG. 1, cable network 22 may include various infrastructure, such as an office and other buildings, in which service router 10, CMTS 8 and backend network 20 may reside. For example, cable network 22 may comprise a central office in which both of service router 10 and CMTS 8 reside. As a result, FIG. 1 illustrates service router 10 as included within cable network 22; however, service router 10 may, in some embodiments, reside in other locations separate from CMTS 8 and backend network 20.

Public network 24, in some examples, comprises any publically accessible computer network, such as the Internet. Public network 24 may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection. These devices, in some examples, are organized into one or more networks, wherein the collection of networks is illustrated in FIG. 1 as a single public network 24. Typically, these devices communicate with one another via a packet-based protocol, such as an Internet Protocol (IP)/Transmission Control Protocol (TCP). As a result, public network 24 may represent or be referred to as a "packet-based" computer network.

Cable network 22 is an edge network, in that cable network 22 resides at the edge of public network 24. Cable network 22 may be referred to as connecting the "last mile" in that cable network 22 provides, manages and/or maintains approximately or loosely the last mile of infrastructure to facilitate access by customers to public network 24. Cable network 22 may also, in some instances, be referred to generally as an "access network" in that cable network 22 facilitates access to public network 24 or, more specifically, as a "cable access network" to distinguish cable access network from other types of access networks. To provide and maintain this access to public network 24, cable network 22 includes CMTS 8 and backend network 20, where CMTS 8 couple to Cable Modems (CMs) 6A-6B ("CMs 6") via coaxial cables 26A-26B ("coaxial cables 26"). Each of CMs 6 typically resides in a separate customer premises (CP) 28A-28B ("CPs 28") along with respective Customer Premises Equipment (CPE) devices 4A-4C ("CPE devices 4"). One or more of CPE devices 4 couple to respective CMs 6 via either a wired or wireless connection, where the connection typically occurs via one of the 802.1X family of communication protocols. CPE devices 4, as described above, may include, to provide a few examples, telephones, routers, switches, residential gateways, set-top boxes, fixed mobile convergence products, home networking adaptors and internet access gateways. In some examples, CPE devices 4 can also include user equipment and/or computing devices, such as a desktop computing device, mobile computing device (e.g., smartphone or tablet), printer, network-attached storage device, mainframe, etc. Techniques of the present disclosure may be applied using any of the example CPE devices listed above.

CMTS 8, in some examples, represents a network device that receives data, often in packet form, from public network 24 and converts the data to a Radio Frequency (RF) signal for transmission over coaxial cables 26. While shown as separate coaxial cables 26 for ease of illustration purposes, CMTS 8 typically couples to a plurality of CMs 6 via a single coaxial cable. Moreover, while described herein as coaxial cables 26, in some instances coaxial cable may only comprise a portion of the link between CMs 6 and CMTS 8, with other transmission mediums, such as fiber optical cable comprising the other portion of the link between CMs 6 and CMTS 8. However, again, for ease of illustration, the link between CMTS 8 and CMs 6 may be referred to herein as "coaxial cable." Thus, while CMTS 8 may convert the data received from public network 24 into RF signals, other devices intermediate to CMTS 8 and CMs 22 may further convert the RF signals into other types of signals, such as optical signals as is common in Radio Frequency over Glass (RFoG) networks to provide one such example.

CMTS 8, in some examples, also represents a network device that receives RF signals from downstream CMs 6 and converts these RF signals to data, which comprise data packets, for transmission upstream to public network 24. "Upstream" communications may refer to communications directed from the edge of cable network 22, such as from CPEs 4 and CMs 6, through cable network 22, e.g., CMTS 8 and service router 10, to public network 24. "Downstream" communications may refer to communications directed from public network 24 through cable network 22, e.g., service router 10 and CMTS 8, to the edge of cable network 22, e.g., CMs 6 and CPE 4.

CMTS 8, in some examples, operates in accordance with one of the various versions of a standard referred to as the "Data Over Cable Service Interface Specification," which is commonly abbreviated as "DOCSIS." Each of these versions of DOCSIS, or simply DOCSIS, provides a standard by which cable network 22 enables customers or, more particularly, CPE devices 4 to access public network 24 via cable network 22. DOCSIS may, for example, specify the necessary customer management functions cable network 22 performs to ensure each customer receives a particular level of service to which the customer subscribed. Typically, CMTS 8 provides these customer management functions, relying on support services provided by backend network 20. CMTS 8 may, in some examples, provide functionality to perform cable management authentication, cable management configuration file downloading, DOCSIS QoS scheduling, and IPDR. More information regarding DOCSIS and the various functionalities provided by DOCSIS may be found in "J.222.2: MAC and Upper Layer protocols for third-generation transmission systems for interactive cable television services—IP cable modems", http://www.itu.int/rec/T-REC-J.222.2, which is herein incorporated by reference.

As shown in the example of FIG. 1, CMTS 8 may be configured to send and receive DOCSIS encapsulated network data 12 with CMs 6. In some examples, CMTS 8 maintains one or more tables or other data structures to manage CMs coupled to CMTS 8 in order to provide the customer management functions described above. For instance, CMTS 8 may associate multiple CMs with a single port of CMTS 8. A DOCSIS port may comprise a channel for transmitting network data via CMTS 8 between CMs 6 and service router 10

In some examples, CMTS 8 maintains relationships between DOCSIS ports, CMs and CPEs to facilitate management of CMs. For instance, DOCSIS port identifier 16A, CM identifier 18A, and CPE identifier 26A may indicate that CPE device 4A is coupled to CM 6A and network traffic from CPE device 4A through CMTS 8 uses DOCSIS port "D0." Similarly, DOCSIS port identifier 16B, CM identifier 18B, and CPE identifier 26B may indicate that CPE device 4C is coupled to CM 6C and network traffic from CPE device 4C through CMTS 8 uses DOCSIS port "D1."

Backend network 20, in some examples, comprises a sub-network of cable network 22 that includes, for example, a Remote Authentication Dial-In User Service (RADIUS) server, a Dynamic Host Configuration Protocol (DHCP) server, and/or a File Transfer Protocol (FTP) server, each of which are not shown in the example of FIG. 1 for ease of illustration purposes. Network 20 may be referred to as a "backend" network in that it resides at the back-end of cable network 22 transparent to customers use CPE devices 4. Often backend networks, such as backend network 20, provide storage and other resources useful in the operation of a network, such as cable network 22.

To illustrate, the operator of cable network 22 may deploy a RADIUS in backend network 20 so as to implement a RADIUS protocol by which one or more of network devices included within cable network 22, such as service router 10, CMTS 8 and CMs 22, may request authentication to access cable network 22. The RADIUS server may maintain authentication information used for authenticating each of these network devices. In this way, the operator of cable network 22 may provide for a centralized authentication server in the form of the RADIUS server located in backend network 20 that may authenticate network devices prior to permitting these devices to access cable network 22.

As another example, the operator of cable network 22 may deploy a DHCP server in backend network 20 that implements DHCP by which one or more of the network devices of cable network 22, such as CMs 6 and CPE devices 4, request parameters required by the network devices to operate in cable network 22. As cable network 22 typically operates as an Internet Protocol (IP) network, these parameters can include parameters required by the network devices to operate in an IP network. These IP parameters can include an IP address and other parameters, including those particular to cable networks, such as a location of a CM configuration file. In this respect, the DHCP server may be considered to maintain a pool of addresses (or, in other words, an address space) comprised of a plurality of addresses from which the DHCP server selects and assigns to each network device permitted to access cable network 22. In other words, the DHCP server provides an address resolution and assignment support service that enables each network device of cable network 22 to be individually and distinctly addressed and located within cable network 22.

CMTS 8 may rely on service router 10, a RADIUS server, and/or DHCP server to provide authentication, address resolution and assignment services in order to manage data services subscribed to by each subscriber/customer. For example, upon powering on, starting up or otherwise activating one of CMs 6, this one of CMs 6 interacts with CMTS 8 to initialize itself within cable network 22. Initialization, according to DOCSIS, may comprise a number of phases, including one or more of 1) a phase concerning scanning and synchronization downstream, 2) a phase concerning obtaining upstream parameters, 3) a phase relating to ranging and automatic adjustments, 4) a phase related to establishing IP connectivity, 5) a phase concerning establishing a time of day, 6) a phase concerning transferring operational parameters, and 7) a phase relating to registration. During the first three phases, the CMTS 8 may generally synchronize the one of CMs 6 to correctly receive downstream traffic and assign a timeslot by which the one of CMs 6 may communicate upstream with CMTS 8, taking into account a range or distance the one of CMs 6 lies from CMTS 8.

The fourth phase related to establishing IP connectivity may comprise the initializing one of CMs 6 issuing a DHCP request that requests an IP address and the location of the CM configuration file associated with the requesting one of CMs 6. CMTS 8 may forward this DHCP request to a DHCP server, which may respond with a DHCP response that assigns the one of CMs 6 an IP address from the plurality of addresses included within the address space maintained by the DHCP server. CMTS 8 may maintain a file associated with the one of CMs 6 and update this corresponding file with the association between the MAC address of the one of CMs 6 and the IP address.

After successful registration, the one of CMs 6 may permit one or more of respective CPE devices 4 to access cable network 22. To access cable network 22, much like CMs 6, each of respective CPE devices 4 require an address. Typically, one or more of CPE devices 4 implements DHCP to interface with one or more DHCP servers (e.g., located in backend network 20, or to a router locally attached to CM 6 and positioned between the CPE and the respective CM) in order to receive a lease for an IP address. The DHCP server may provide the lease via a DHCP response message, sending the DHCP response message downstream through CMTS 8 to the one of CPE devices 4. CMTS 8 may snoop these DHCP response messages to determine the IP address assigned to CPE device 4 and associate each address assigned to CPE devices 4 with the address assigned to the one of CMs 6 within the file maintained for the one of CMs 6.

Conventionally, CMTSs included functionality to act as IP edge routers, receiving packets from CMs and routing IP network packets into a core network. To perform IP routing, CMTSs included hardware to perform lookup techniques, such as Longest Prefix Matching (LPM), to select entries from routing tables. CMTSs also conventionally included functionality to provide subscriber management services, which may include application of subscriber-specific services, such as one or more of a deep packet inspection service, a video conferencing service, a mobile IP service, a packet filtering service, a web conferencing service, virus detection, network based printing and file sharing services, cloud based services, and the like.

That is, usually, each customer subscribes to and pays for, as part of the cable data service, a particular level of service, such as a set amount of bandwidth. To provide this level of service, the CMTS may provide, in accordance with DOCSIS, all subscriber or customer management functions by which to register CMs for operation within the cable network at the corresponding purchased level of service. These customer management functions may include maintaining CM service profiles for each CM that indicate, in part, the level of service provided to traffic originating from a corresponding CM. The CMTS may therefore be considered to "own" this customer management functionality in that typically no other device in a cable access network is aware of individual customers. The CMTS may represent the conventional type of network device within conventional cable networks that is "aware" of individual customers, as the CMTS is the only type of network device required by DOCSIS to interface individually with the CMs and associated CPE.

As a result of being the conventional network device that is aware of individual customers, service provides may conventionally attempt to adapt CMTS devices to provide new or emerging services that depend on subscriber or customer awareness. Typically, the CMTS cannot be upgraded to provide these new customer aware servers and the cable network operations have to replace the currently deployed CMTS and/or CMs with a CMTS and/or CMs that support these new services. Having to replace the currently deployed CMTS and/or CMs in order to deploy these new customer aware services is typically expensive, requiring a large capital expenditure (CAPEX). Due to the expense, deployment of these customer aware services may be slow, potentially hampering customer satisfaction in that competing types of access networks may more readily deploy these types of services.

In accordance with techniques of the disclosure, cable network 22 may be deployed using modular hardware such that subscriber management services and layer-3 routing functionality are offloaded from CMTS 8 to service router 10. In operation, CMTS 8 may perform all DOCSIS functionality but forward the packets to service router 10 or other network devices positioned between CMTS 8 of cable access network 22 and public network 24 (which again may represent the Internet) for application of differentiated services. Because service router 10 is not required to implement the DOCSIS standard, service router 10 may more readily be adapted to provide new or emerging differentiated services that depend on customer or subscriber awareness. That is, because service router 10 does not have to work with the DOCSIS standards body before offering these new or emerging services, service router 10 may more freely deploy services in comparison to deployment of services in conventional cable networks. Consequently, the techniques may provide for a seamless network architecture in which CMTS 8 provides DOCSIS functionality while service router 10 provides the differentiated services, offloading these services from having to be performed by CMTS 8. In this way, service router 10 may be quickly adapted to offer the new and emerging services without having to replace CMTSs with upgraded CMTSs, potentially reducing CAPEX, while also promoting rapid service deployment in that service router 10 does not have to seek approval from the DOCSIS standards body before deploying these services.

In order to enable application of per-subscriber differentiated services, service router 10 may initially specify a Multiprotocol Label Switching (MPLS) labels that CMTS devices coupled to service router 10 may apply to an MPLS label stack included within network packets. Although various examples of the disclosure are illustrated using MPLS, the techniques described in this disclosure may be implemented using any suitable protocol that includes stackable labels or tags, such as MPLS, Q-in-Q, Virtual Private Local Area Network Service (VPLS), etc. Consequently, service router may allocate labels for any of the above identified tunneling protocols and CMTS 8 may send network packets to service router 10 in MPLS or Q-in-Q tunnels.

In one example, service router 10 may initially allocate a first group of MPLS labels (which may be referred to as "CMTS labels") that uniquely identify CMTS devices communicatively and/or operatively coupled to service router 10. Service router 10 may store associations between the CMTS devices and corresponding CMTS labels, such that each different label in the CMTS labels uniquely identifies a different CMTS device. Service router 10 may also be configured to allocate, for each CMTS device, a second group of MPLS labels ("CPE labels"), i.e., each CMTS device may receive CPE labels from service router 10. Each label in the CPE labels may, for a particular CMTS device, identify a different CPE device that is communicatively and/or operatively coupled to the respective CMTS device. For instance, as shown in FIG. 1, service router 10 may specify a first MPLS label in the CMTS labels that uniquely identifies CMTS 8. Service router 10 may further allocate the CPE labels that CMTS 8 may use to uniquely identify CPE devices 4 that communicate with CMTS 8. Based on the CMTS label and the CPE label stored to the label stack, service router 10 may uniquely identify the corresponding one of CPE device 4 that sent the network packet and thereby determine which of the subscriber-specific services to apply to the corresponding network packet.

In response to receiving a packet from one of CPE devices 4, CMTS 8 may associate a CMTS label identifying CMTS 8 with the network packet while also associating one of CPE labels identifying the one of CPE devices 4 that sent the network packet with the network packet. CMTS 8 may then forward this labeled network packet having the associations with the CMTS label and the one of CPE labels to service router 10. When service router 10 receives a network packet from CMTS 8, service router 10 uses the MPLS labels (i.e., the CMTS label and the one of CPE labels in this example) stored to the MPLS label stack of the network packet to identify subscriber specific services to apply to the network packet. As described throughout this disclosure, a "subscriber" may refer to a single CPE device or a customer associated with a single CPE device.

In operation, CMTS 8 may, for example, receive a network packet from one of CPE devices 4 via a corresponding one of CMs 6, where this network packet may be encapsulated in accordance with DOCSIS. This DOCSIS-encapsulated packet may include a DOCSIS header that encapsulates a network packet. CMTS 8 may process the DOCSIS-encapsulated packet to decapsulate the DOCSIS header from the network packet and determine a first label (or, in other words, a CMTS label) that uniquely identifies CMTS 8 within a plurality of CMTSs coupled to service router 10. Typically, service router 10 signals the CMTS label to CMTS 8 using a label distribution protocol (LDP) or other MPLS label signaling protocol. CMTS 8 may then determine a second label (or, in other words, one of the CPE labels) that is associated the one of CPE devices 4 that sent the network packet and uniquely identifies the one of CPE devices 4 that sent the network packet within CPE devices 4 coupled to CMTS 8. CMTS 8 may then associate the CMTS label and the one of CPE labels with the decapsulated network packet to generate a labeled network packet. CMTS 8 then forwards the labeled network packet to service router 10 such that service router 10 is capable of applying at least one subscriber-specific service to the labeled network packet based at least in part on the first label and the second label.

In any event, service router 10 may, therefore, receive a labeled network packet that is associated with a CMTS label and a CPE label, where the CMTS label uniquely identifies CMTS 8 within a plurality of CMTSs coupled to service router 10 and the CPE label uniquely identifies the one of CPE devices 4 coupled to CMTS 8 that sent the network packet. Additionally, service router 10 may determine at least one subscriber-specific service associated with the one of CPE devices 4 based at least in part on the CMTS label and the CPE label associated with the labeled network packet. The at least one subscriber-specific service comprises a service associated with the one of CPE devices 4. Service router 10 may then apply the determined at least one subscriber-specific service to the network packet received from CMTS 8 contrary to conventional cable networks in which the CMTSs were the only devices capable of applying subscriber-specific services to network packets considering that these CMTSs were one of the few types of network devices that were subscriber "aware" in the sense of being able to uniquely identify each of CPE devices 4.

In this way, the techniques described in this disclosure may provide a modular deployment alternative, consistent with the target deployment model of M-CMAP, but providing additional functionality by treating subscribers (e.g., CPE devices) within a household, for example, as managed elements via a service router (e.g., service router 10). Techniques of the disclosure may provide service router 10 with visibility both into the number of subscribers in the household as well as the services those subscribers are consuming and/or accessing. Since service visibility on a per-subscriber may now be possible using the techniques described in this disclosure, service router 10 can either limit and/or provide per subscriber-based services.

Since service router 10 may provide service awareness through implementation of the techniques described in this disclosure, the operator of cable network 22 may no longer need to continually deploy more "intelligent" devices that enable these new subscriber aware services into households. This may allow a Multiple System Operator (MSO) to lower its capital expenditures (CAPEX) associated with delivering services to a new subscriber as well as increase service velocity as the customer premise equipment can be kept simple and, in some examples, reduce the need to deploy new CPE and/or CMTS devices to offer new services. Furthermore, since the protocols between the access shelf (or CMTS) and the upstream aggregation router (e.g., service router 10) are based on industry standard protocols, the operator of cable network 22 may take advantage of prior technology developments and existing network architectures using techniques of the present disclosure.

Figure 2:
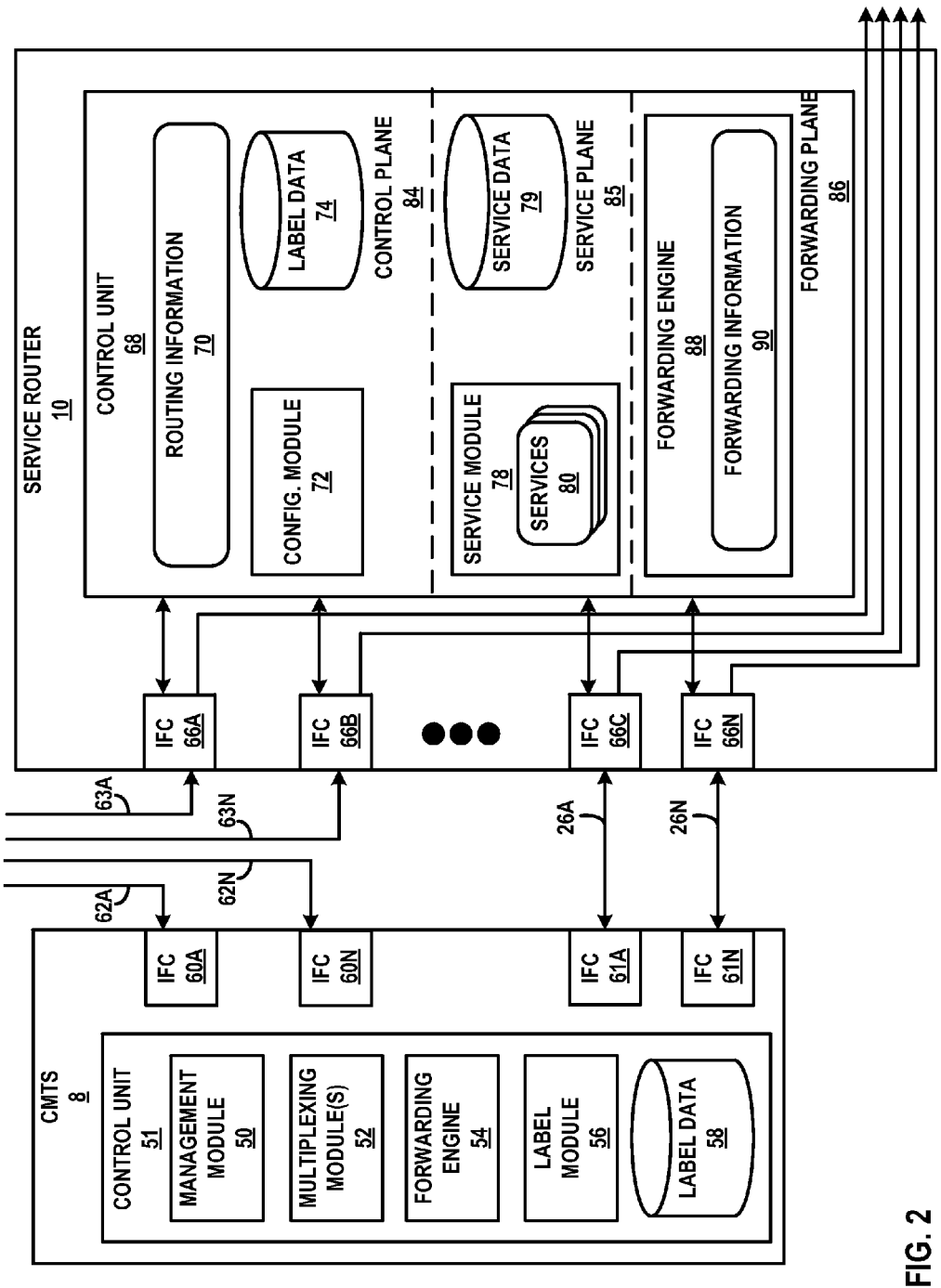
FIG. 2 is a block diagram illustrating the Cable Modem Termination System (CMTS) and service router of the example of FIG. 1 in more detail.

FIG. 2 is a block diagram illustrating a portion of network system 2 in more detail. In particular, CMTS 8 and service router 10 are depicted in more detail in the example of FIG. 2. As shown in the example of FIG. 2, CMTS 8 includes a control unit 51, management module 50, multiplexing modules 52, forwarding engine 54, label module 56, label data 58, interfaces 60A-60N and interfaces 61A-61N. As further shown in the example of FIG. 2, network links 26A-26N ("network links 26") may be coupled to interfaces 60A-60N. Network links 26 may be coaxial cables in some examples that couple CMTS 8 to one or more of CMs 6. Network packets may be sent to and from CMs 6 using network links 26.

Control unit 51 of CMTS 8 may comprise one or more processors (not shown in FIG. 2) that execute software instructions stored to a computer-readable storage medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 51 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

CMTS 8 also includes multiplexing modules 52. Multiplexing modules 52 may perform data path processing functions, such as processing IP packets received from service router 10 into DOCSIS encapsulated packets. Multiplexing modules 52 may similarly decapsulate DOCSIS encapsulated packets received from cable modems via network links 26. Consequently, multiplexing module 52 may include functionality to perform conversation and modulation of data (i.e., packets in this example) for Radio Frequency (RF) transmission via network links 26. As shown in the example of FIG. 2, CMTS 8 also includes forwarding engine 54. Forwarding engine 54 may include hardware or a combination of hardware and software that provide the functionality and features to forward network packets received from cable modems by CMTS 8 to service router 10. For instance, forwarding engine 54 may include one or more forwarding ASICS that CMTS 8 may use to forward network packets according to label stacks associated with the network packets.

CMTS 8, as shown in the example of FIG. 2, may also be coupled to service router 10 using network links 64A-64N. Network links 64A-64N may be any suitable communication channel to communicate network packets between CMTS 8 and service router 10. For instance, network links 64A-64N may include cables and/or wireless connections using any number of protocols such as Ethernet, ATM, etc. As will be described below in this disclosure, CMTS 8 also includes a management module 50 to configure the various modules and components of CMTS 8, in accordance with techniques of the present disclosure. CMTS 8 also includes label module 56 that applies labels specified in label data 58 to a label stacks appended to network packets received from CMs 6.

As further shown in the example of FIG. 2, service router 10 includes a control unit 68 and interfaces 66A-66N. Interfaces 66A-66N may be any suitable network interfaces for sending and receiving information. For instance, interfaces 66A-66N may be wired or wireless network interfaces that may use any number of protocols, such as Ethernet, ATM, etc. Interfaces 66A-66N may be operatively, physically and/or communicatively coupled to one or more components (e.g., control unit 68) of service router 10. In some examples, other network devices may be coupled to service router 10 using network links 63.

Control unit 68 of service router 10 may comprise one or more processors (not shown in FIG. 2) that execute software instructions stored to a computer-readable storage medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control units 68 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 68, in some examples, includes a plurality of modules and data, including routing information 70, configuration module 72, label data 74, service module 78, services 80, service data 79, forwarding engine 88 and forwarding information 90. As shown in the example of FIG. 2 and further described below with respect to the example of FIG. 5, modules and components may be logically described in various planes including control plane 84, service plane 85, and forwarding plane 86. Configuration module 72 may further include a hardware module or a combination of hardware and software modules that enables service router 10 to authenticate with a RADIUS server so as to enable service router 10 to join cable network 22.

When service router 10 is initially coupled to cable network 22, configuration module 72 may interact with a RADIUS server via a RADIUS protocol session to transmit authenticating information via an authentication request to the RADIUS server, which as noted above may be located in backend network 20. The RADIUS server may receive the authentication request and authenticate the authenticating information included in the request. Authenticating information may comprise a username and password, a security key, a token, a certificate or any other type of information commonly used to authenticate a network device, such as service router 10. The RADIUS server, based on successful authentication, issues credentials or some other information identifying that service router 10 has been properly authenticated via an authentication response. Configuration module 72 may utilize these credentials to access other devices on cable network 22 including CMTS 8. Once authenticated, service router 10 can begin receiving both upstream and downstream network traffic from CPEs 4 and public network 24. CMTS 8 may also authenticate with the RADIUS server upon initially joining cable network 22 in a manner similar to that described above with respect to service router 10.

Upon authenticating with the RADIUS server, management module 50 of CMTS 8 may use an Out of Band (OOB) protocol to communicate various forms of configuration information. One example of such an OOB protocol may be specified in RFC 4448, http://tools.ietf.org/html/rfc4448, which is herein incorporated by reference. In some examples, CMTS 8 and service router 10 may use the OOB protocol to coordinate CM service-group mappings so that subscription rates for specific CMs may be converted to an IP subscriber QoS profile. The OOB protocol may also be used by service router 10 and CMTS 8 to coordinate the DOCSIS network topology (e.g., the DOCSIS DS/US port) and subscriber set virtual interfaces on service router 10. In other examples, CMTS 8 and service router 10 may use the OOB protocol to facilitate network analytics coordination so that per-subscriber usage can be coordinated with per CM usage rates reported by CMTS 8.

In one example, CMTS 8 may implement various aspects of the techniques described in this disclosure to send, using the OOB protocol, a request to service router 10 for labels that CMTS 8 may apply to network packets received by CMTS 8 from CPE devices 4 in order to enable service router 10 to apply subscriber-specific services. Upon receiving the request, configuration module 72 of service router 10 may query label data 74. The request may specify the MAC address of CMTS 8. In some examples, control unit 68 of service router 10 may store label data 74 in a suitable data structure, such as a database, lookup table, etc. Label data 74 may include associations between MAC addresses of CMTSs communicatively and/or operatively coupled to service router 10 and MPLS labels that uniquely identify each CMTS device coupled to service router 10 (i.e., the first group of labels or CMTS labels in the examples described in this disclosure). While various examples of the disclosure use MAC addresses to identify CMTS and CPE devices, other suitable identifiers may be used, such as Internet Protocol (IP) addresses.

If configuration module 72 of service router 10 determines that the MAC address received in a request from CMTS 8, for example, does not match any associations with labels that unique identify CMTSs, configuration module 72 may generate a new association between CMTS 8 and one of the CMTS labels. Upon generating this association, configuration module 72 may store the newly generated association to label data 74. Configuration module 72 also, in response to receiving the request from CMTS 8 for labels, generates a group of labels (which, again, may be referred to as CPE labels") that can be used to uniquely identify CPE devices that are communicatively and/or operatively coupled to CMTS 8. For instance, in response to receiving a request from CMTS 8 for labels, configuration module 72 of service router 10 may allocate a group of CPE labels that are reserved for CMTS 8 to uniquely identify CPE devices coupled to CMTS 8. Initially, the CPE labels may not be associated with specific CPE devices. CMTS 8 and service router 10 may associate CPE labels with CPE devices as the CPE devices couple to cable network 22. Service router 10 may use the CPE labels in conjunction with the CMTS label to uniquely identify CPE devices and apply subscriber-specific services to network packets sent by the CPEs.

Configuration module 72, after generating the CMTS label that identifies CMTS 8 and the CPE labels, may send the labels to CMTS 8. Upon receiving the labels, management module 50 of CMTS 8 may initially store the CMTS label and CPE labels as label data 58. In some examples, CMTS 8 may store label data 58 in a suitable data structure, such as a database, lookup table, etc. CMTS 8, in some examples, may implement one or more tunneling protocols, such as MPLS, Q-in-Q, and/or other protocols with label or tag stacks, which may utilize these labels when sending network packets from CMTS 8 to service router 10.

Management module 50 may use one or more MPLS protocols, such as a label distribution protocol (LDP) or a resource reservation protocol (RSVP), to establish a Label Switched Path (LSP) within cable network 22 from CMTS 8 to service router 10 based on the CMTS label. For example, upon receiving the CMTS label from service router 10, management module 50 of CMTS 8 may determine a physical interface (e.g., one or more of 61A-61N) to be used for forwarding network packets to next hops. Management module 50 may establish an LSP associated with the CMTS label by associating the CMTS label with a physical interface and a next hop (e.g., service router 10). For instance, management module 50 may program forwarding engine 54 to forward packets that include the CMTS label to service router 10 using the LSP. Forwarding engine 54 may include ASICs, which may be microcode-controlled chipsets programmably configured by management module 50.

After CMTS 8 has configured the LSP corresponding to the CMTS label, CPE device 4A may initially couple to CM 6A as shown in FIG. 1. Upon initially coupling to CM 6A, CPE device 4A begins sending network packets to public network 24. CM 6A may receive the network packets from CPE device 4A and encapsulates the packets according to the DOCSIS protocol. CM 6A may send the DOCSIS-encapsulated network packets to CMTS 8. CMTS 8 receives the DOCSIS-encapsulated network packets via network links 26A.

Multiplexing module 52 initially receives the DOCSIS-encapsulated network packets. The DOCSIS-encapsulated network packets may each include one or more DOCSIS headers that conform to the DOCSIS protocol. Upon receiving a DOCSIS-encapsulated network packet, multiplexing module 52 processes the network packet to decapsulate the DOCSIS header from the network packet. For instance, multiplexing module 52 may remove the DOCSIS header from the network packet. Upon removing the DOCSIS header, the network packet may include an Ethernet frame that further includes an IP network packet.

After decapsulating the DOCSIS header from the network packet, label module 56 determines a first label ("CMTS label") that uniquely identifies CMTS 8 within CMTSs coupled to service router 10. For instance, label module 58 may select the CMTS label from label data 58 that CMTS 8 initially received from service router 10. In accordance with techniques of the disclosure, label module 56, upon determining the CMTS label, label module 56 associates the CMTS label with the decapsulated network packet. In some examples, associating the CMTS label with the decapsulated network packet includes adding the CMTS label as a header of the network packet.

Label module 56 also determines a second label that uniquely identifies CPE device 4A within a group of CPE devices coupled to CMTS 8. For example, label data 58 may include the group of CPE labels that CMTS 8 initially received from service router 10. Label data 58 may include associations of MAC addresses of CPE devices coupled to CMTS 8 and CPE labels that uniquely identify the CPE devices. Label module 56 queries label data 58 to determine if a MAC address associated with CPE 4A matches a MAC address of one of the associations in label data 58. Label module 56 may determine the MAC address of CPE 4A based on the Ethernet header included in the network packet. In the current example, because CPE device 4A has initially coupled to CMTS 8, no MAC address of the associations in label data 58 matches the MAC address of CPE device 4A. Consequently, label module 56 may select an unused CPE label in the group of CPE labels received from service router 10. Label module 56 then generates an association in label data 58 between the selected CPE label and the MAC address of CPE device 4A. Upon determining the CPE label that uniquely identifies CPE 4A, label module 56 associates the CPE label with the network packet. For instance, label module 56 may add the CPE label as a header of the network packet. In this way, label module 56 may associate a label stack that includes the CMTS label and the CPE label with the network packet.

Upon applying the label stack to the network packet, forwarding engine 54 may forward the labeled network packet to service router 10. For example, forwarding engine 54 may determine the CMTS label associated with the network packet. Forwarding engine 54 may perform a lookup to determine a next hop that matches the CMTS label. For example, forwarding engine 54 determines may determine the LSP that is associated with the CMTS label of the packet. Forwarding engine 54 may then identify the corresponding output interface and next hop. Forwarding engine 54 may subsequently forward the network packet to service router 10 using the LSP corresponding to the output interface. In the current example, forwarding engine 54 may determine the interface, e.g., interface 61A, associated with the CMTS label of the network packet and forward the network packet to service router 10.

Service router 10, in turn, receives the network packet at interface 66C via network link 64A. Initially, forwarding engine 88 may receive the network packet from interface 66C. As will be further illustrated in FIG. 4, forwarding engine 88 may include a flow control unit to selectively direct network packets to service module 78 for processing to apply subscriber specific services. Thus, forwarding engine 88 may receive network packets and determine based on the label stacks associated with the network packets whether to send the packets to service module 78 in order to apply subscriber specific services. Service module 78 in some examples may be hardware, software, or a combination thereof, that receives packets from forwarding engine 88, selectively applies subscriber-specific services to the packets in accordance with the label stacks, and relays the packets forwarding engine 88 for forwarding to public network 24.

In the current example, when forwarding engine 88 initially receives the network packet that includes the CMTS label and the CPE label, forwarding engine 88 determines that the network packet belongs to a new packet flow that does not match any of its filters in forwarding information 90. Forwarding information 90 in some examples may include information such as filters or other forwarding information as further described in forwarding information base 192 of FIG. 5. Such filters may be associated with CPE labels and specify particular actions to be performed by forwarding engine 88 when a packet is received that matches the fitter (e.g., forwarding network packets to service module 78). If labels of the network packet do not match any filters, forwarding engine, in some examples, sends the packet to a service cards for further processing. In other examples, if labels of the network packet do not match any figures, forwarding engine 88 may simply forward the network packet to a next hop in the network route to the network packet destination. Because forwarding engine 88 has determined that the network packet belongs to a new packet flow from CPE device 4A, forwarding engine 88 sends the network packet to service module 78

In some examples, service module 78 may be a Service Physical Interface Card (S-SPIC). Service router 10 typically include a chassis (not shown in the example of FIG. 2 for ease of illustration purposes) having a number of slots for receiving a set of cards, such as service physical interface cards (service PICs). Service module 78 may, in some examples, be a service PIC. Each card may be inserted into a corresponding slot of a chassis for communicably coupling the card to control unit 68 via a bus, backplane, or other electrical communication mechanism. Service module 78 may include control units, packet forwarding engines, and other components to perform various functions, such as applying subscriber-specific services to network packets.

Service module 78, upon receiving the network packet may query a RADIUS server to authenticate CPE device 4A. To authenticate CPE device 4A, service module 78 send authentication credentials included in the network packet from CPE device 4A to the RADIUS server. In some examples, the authentication credentials may include a MAC address of CPE device 4A, username, password, token, etc. The RADIUS server may provide a response that indicates whether CPE device 4A is allowed to access cable network 22. The response may include a subscriber identifier that identifies CPE 4A. Consequently, service module 78 may store an association in service data 79 between the subscriber identifier and the CPE label associated with the network packet received from CPE 4A. In some examples, service module 78 may further associate the subscriber identifier with the DOCSIS port of CMTS 8 coupled to CM 6 that services packet flows from CPE 4A.

Service module 78 may determine which subscriber-specific services are associated with CPE device 4A. To determine which services are associated with CPE 4A, service module 78 may query associations in service data 79 between subscriber identifiers and service definitions. Service definitions may define specific services or actions to apply to network packets. In the current example, service module 78 may determine that multiple service definitions are associated with the subscriber identifier of CPE device 4A. Consequently, service module 78 may load the service definitions associated with CPE device 4A, which may be applied as services 80 to network packets received from CPE device 4A. Service module 78 may further associate each respective service of CPE device 4A with the CPE label that identifies CPE deice 4A. In this way, when network packets from CPE deice 4A are received by service router 10, service module 78 may apply subscriber specific services to the network packets based on the CPE label associated with packets. Service module 78 may further send filter information to forwarding engine 88 that causes forwarding engine 88 to redirect network packets matching the CPE label of CPE device 4A to service module 78. When subsequent network packets are received from CPE device 4A, forwarding engine 88 may redirect the network packets to service module 78 based on the filter information. For instance, as further described in FIG. 5, forwarding engine 88 may determine that a CPE label associated with network packet matches filter information stored in forwarding information 90 and redirect the network packet to service module 78. Upon applying subscriber specific services to the network packets, service module 78 may send the network packets to forwarding engine 88, which may forward the network packets to a next hop in a network route to the destination specified by the network packets.

In this manner, service router 10 may provision differentiated services 46 on a per-subscriber basis, for example, per-CPE device. Some examples of per-subscriber services may include facilitating the delivery of next generation IP traffic that corresponds to next generation IP services, such as VoIP, IPTV, and the like. Other such subscriber-specific services may include packet filtering, logging, Intrusion Detection and Prevention (IDP) analysis, virus scanning, and deep packet inspection. Still other subscriber-specific services may include a video conferencing service, a mobile Internet Protocol service, network-based printer service, a storage service, or a web conferencing service. The previous services are example services and other such services are contemplated within the scope of this disclosure. Any such subscriber-specific service, can be applied to network packets received from a specific CPE device based on the CPE label when received by service router 10.

Figure 3:
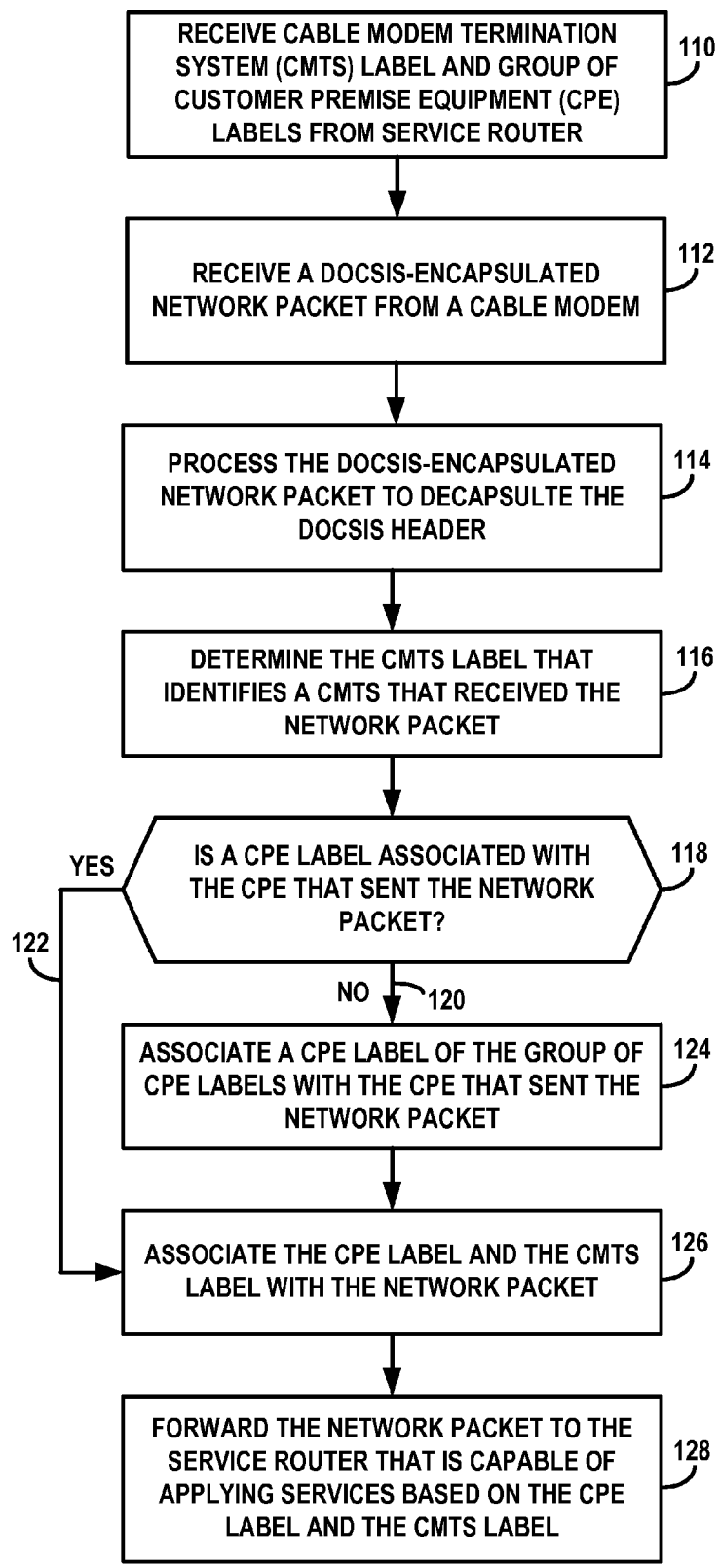
FIG. 3 is a flowchart that illustrates example operations of a CMTS that implements the techniques described in this disclosure.

FIG. 3 is a flowchart that illustrates example operations of a Cable Modem Termination System, such as CMTS 8 of the example of FIG. 1, that implement techniques of the present disclosure. While described with respect to CMTS 8 in FIG. 1, the techniques may be implemented by any type of network device capable of performing one or more functions of CMTS 8 described in the disclosure.

Referring to FIG. 1, CMTS 8 may initially receive a CMTS label and a group of CPE labels from service router 10 (110). The CMTS label may uniquely identify CMTS 8 within a group of CMTS devices coupled to service router 10. Furthermore, the CPE labels may uniquely identify each CPE device within a group of CPE devices that are coupled to CMTS 8. CMTS 8 may subsequently receive DOCSIS-encapsulated network packets from CPE devices via cable modems coupled to CMTS 8 (112). For instance, CPE 4A may send a network packets that are destined to devices in public network 24.

Upon receiving a DOCSIS-encapsulated packet from CPE 4A, CMTS 8 may process the DOCSIS-encapsulated packet to remove the DOCSIS header from the network packet (114). CMTS 8, upon removing the DOCSIS header from the network packet may determine the CMTS label that identifies CTMS 8 (116). For instance, CMTS 8 may select the CMTS label that identifies CMTS 8 from a lookup table, database or other suitable data structure for storing data. CMTS 8, in some examples, may also determine whether a CPE label is currently associated with the CPE 4A that sent the network packet (118). To determine whether a CPE label is associated with CPE 4A, CMTS 8 may query associations between MAC addresses of CPEs and CPE labels. If no CPE label is associated with the MAC address of CPE 4A (120), CMTS 8 may associate a CPE label with the MAC address of CPE 4A. In this way, CMTS 8 may associate a CPE label with CPE 4A that sent the network packet (124).

In other examples, CMTS 8 may determine that a CPE label is already assigned to the CPE device that sent the network packet (122). In such examples, CMTS 8 may associate the CPE label of the CPE device that sent the network packet and the CMTS label with the network packet (126). For example, CMTS 8 may include the CMTS label and CPE label in the header of the network packet. Once CMTS 8 has included the CMTS label and the CPE label in the header of the network packet, CMTS 8 may forwarding the network packet to service router 10 (128). Service router 10 may use the CPE label and the CMTS label to apply subscriber-specific services to network packets received from CPE 4A.

Figure 4:
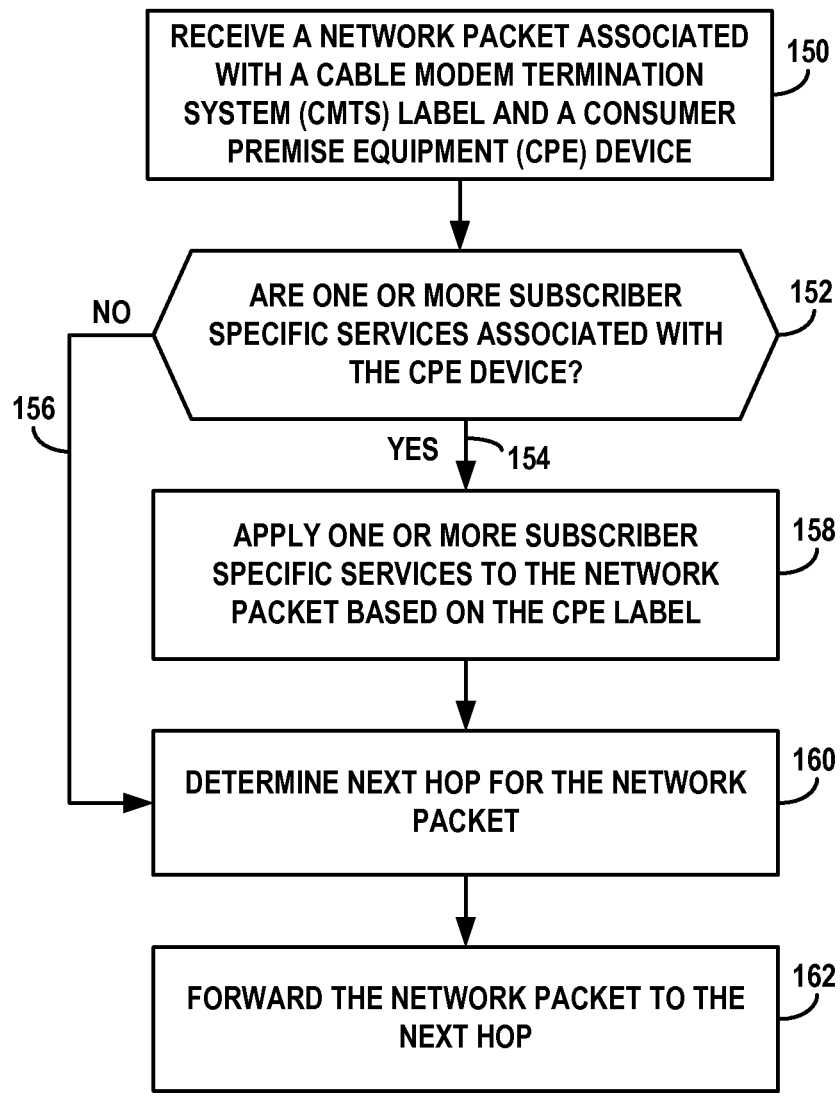
FIG. 4 is a flowchart that illustrates example operations of a service router that implements the techniques described in this disclosure.

FIG. 4 is a flowchart that illustrates example operations of a router, such as router 10 of the example of FIG. 1 that may implement subscriber specific services in accordance with this disclosure. While described with respect to service router 10 in FIG. 1, the techniques may be implemented by any type of network device capable of performing one or more functions of service router 10 described in the disclosure.

Referring to FIG. 4, service router 10, may initially receive a network packet associated with CMTS 8 and CPE 4A (150). For instance, CPE 4A may send a network packet to CMTS 8, which may associate a CPE label and CMTS label with the network packet. CMTS 8 may then forward the network packet to service router 10. For instance, CMTS 8 may forward the network packet to service router 10 using a Label Switched Path that is associated with the CMTS label of the network packet.

Upon receiving the network packet, servicer router 10 may determine whether one or more subscriber-specific services are associated with the CPE device (152). For example, service router 10 may compare the CPE label to a group of associations between CPE labels and subscriber identifiers. If the CMTS label associated with the network packet matches the CPE label of one of the associations (154), servicer router 10 may apply one or more subscriber-specific services to the network packet based on the CPE label (158). Servicer router 10, upon applying subscriber-specific services to the network packet may determine the next hop for the network packet (160). In this way, service router 10 may perform layer 3 routing to forward the network packet to the next network device in the network route from CPE 4A to the destination of the network packet. Upon determining the next hop for the network packet, service router 10 may forward the network packet to the next hope. As shown in FIG. 1, in other examples, if no subscriber-specific services are associated with the CPE label (156), service router 10 may determine the next hop for the network packet and forward the packet accordingly.

Figure 5:
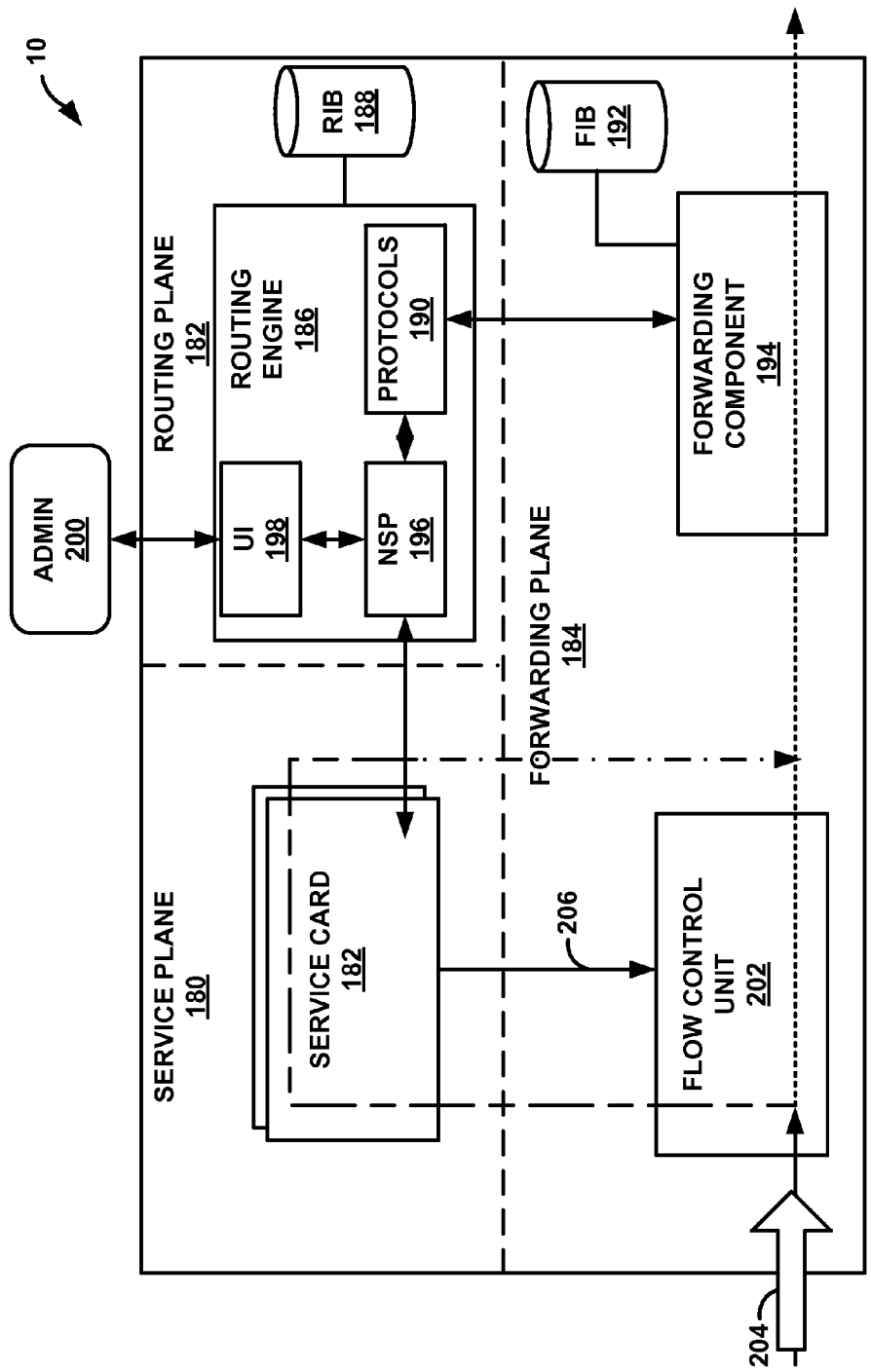
FIG. 5 is a block diagram illustrating an example router that integrates a service plane, routing plane, and forwarding plane to implement the techniques described in this disclosure.

FIG. 5 is a block diagram illustrating an example router that integrates a service plane 180, routing plane 182, and forwarding plane 184. Service router 10 may, for example, be a high-end router capable of deployment within a service provider network. Moreover, forwarding plane 184 may be provided by dedicated forwarding integrated circuits normally associated with high-end routing and forwarding components of a network router. U.S. Patent Application 2008/0044181, entitled MULTI-CHASSIS ROUTER WITH MULTIPLEXED OPTICAL INTERCONNECTS, describes a multi-chassis router in which a multi-stage switch fabric is used as a high-end forwarding plane to relay packets between multiple routing nodes of the multi-chassis router. The entire contents of U.S. Patent Application 2008/0044181 are incorporated herein by reference.

As shown in the example embodiment of FIG. 5, service router 10 integrates a service plane 180 and a routing plane 182 that utilize a shared forwarding plane 184. Forwarding plane 184 is a rich and dynamic shared forwarding plane, optionally distributed over a multi-chassis router. Moreover, forwarding plane 184 may be provided by dedicated forwarding integrated circuits normally associated with high-end routing components of a network router. Consequently, routing plane 182 and forwarding plane 184 operate as a high-end router, and service plane 180 has been integrated within router 10 (e.g., by way of service cards 182) so as to use forwarding plane 184 of the routing components in a shared, cooperative manner. Further details of one example embodiment of router 10 can be found in U.S. Provisional Patent Application 61/054,692, filed May 20, 2008, entitled "STREAMLINED PACKET FORWARDING USING DYNAMIC FILTERS FOR ROUTING AND SECURITY IN A SHARED FORWARDING PLANE," which is incorporated herein by reference.

Routing plane 182 provides a routing engine 186 that is primarily responsible for maintaining a routing information base (RIB) 188 to reflect the current topology of a network and other network entities to which service router 10 is connected. For example, routing engine 182 provides an operating environment for execution of routing protocols 190 that communicate with peer routers and periodically update RIB 190 to accurately reflect the topology of the network and the other network entities. Example protocols include routing and label switching protocols, such as mpBGP, ISIS, RSVP-TE and LDP, to establish VPNs, LSPs and for exchanging labels.

In accordance with RIB 188, forwarding component 194 maintains forwarding information base (FIB) 192 that associates network destinations or MPLS labels with specific next hops and corresponding interface ports of output interface cards of service router 10. Routing engine 186 typically processes RIB 188 to perform route selection and generate FIB 192 based on selected routes and allocated MPLS labels. In this way, routes as well as labeling information can be programmed into forwarding plane 184. Routing engine 186 may generate FIB 192 in the form of a radix tree having leaf nodes that represent destinations within the network. U.S. Pat. No. 7,184,437 provides details on an exemplary embodiment of a router that utilizes a radix tree for route resolution, the contents of which is incorporated herein by reference in its entirety.

When forwarding a packet, forwarding component 194 traverses the radix tree to a leaf node based on information within a header of the packet to ultimately select a next hop and output interface to which to forward the packet. Based on the selection, forwarding component may output the packet directly to the output interface or, in the case of a multi-stage switch fabric of a high-end router, may forward the packet to subsequent stages for switching to the proper output interface.

Network services process (NSP) 196 of routing engine 186 communicates with and programs service card 182. For example, routing engine may present a user interface (UI) 198 as described above so as to receive configuration data from administrator 200 defining subscriber-specific services and policies with respect to physical interfaces, sub-interfaces or MPLS tunnels. In response, NSP 196 programs services cards 182 with corresponding configuration data, causing the service cards 182 to recognize label stacks of network packets and apply subscriber-specific services corresponding label stacks of network packets when processing packets from forwarding plane 184. Each service card 182 may, for example, execute a microkernel that operates as a consumer of state information and listens for communications from NSP 196.

In this way, routing plane 182 and service plane 180 interact such that service plane 180 is made aware of state information associated with the labeled network packets flowing through the routing device. For example, NSP 196 of routing engine 182 programs the service cards with information that associates subscriber identifiers and CPE labels. For instance, NSP 196 may query a RADIUS server to determine a subscriber identifier of CPE device, and NPS 196 may associate the subscriber identifier with a corresponding CPE label. In other examples, service card 182 can query the RADIUS server and associate a subscriber identifier with the corresponding CPE label. NSP 196 may also query protocols 190 and RIB 188 to provide the service cards 182 with information maintained with RIB 188.

Forwarding plane 184 may include a flow control unit 202 to selectively direct packets to service plane 180 for processing. For example, flow control unit 202 receives incoming packet flows 204 (e.g., IP traffic including network packets that are associated with label stacks) and determines whether to send the packets service plane 180 for processing within one or more of service cards 182, or whether to bypass service plane 180. Service cards 182 receive packets from flow control unit 202, selectively provide subscriber-specific services to the packets in accordance with services associated with subscribers, and relay the packet or any response packets to forwarding plane 184 for forwarding by forwarding component 194 in accordance with FIB 192.

Service cards 182 within service plane 180 may be installed along a backplane or other interconnect of service router 10 to perform a variety of subscriber-specific services on the packets received from forwarding plane 184, such as filtering, logging, Intrusion Detection and Prevention (IDP) analysis, virus scanning, deep packet inspection. In some cases, service card 182 may issue commands 206 to dynamically configure a flow table (not shown) within flow control unit 202 of forwarding plane 184. For example, when flow control unit 202 receives a packet and determines that the packet belongs to a new packet flow that does not match any of its filters, flow control unit 206 may send the packet to service cards 182 for processing. Upon receiving and processing the packet or packets of a packet flow, service cards 182 may issue a command 206 to install a dynamic filter within the flow table, such as an exact match filter that indicates particular actions to be performed when a packet is received that matches the filter. In the case that service cards 182 determine no further services need be applied to a packet flow, service cards 182 may install a filter within flow control unit 202 to specify that subsequent packets of this packet flow session may be processed on a path to service plane 180. When flow control unit 202 receives a subsequent packet of the same packet flow, flow control unit 202 checks the flow table, determines that the packet matches the new filter, and directs the packet on the appropriate path according to the filter. In this example, subscriber-specific services are integrated within a single service router 10 that uses a shared forwarding plane 184 suitable for high-speed forwarding functions.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various aspects of this disclosure have been described. These and other aspects are within the scope of the following claims.

The invention claimed is:

1. A method comprising:
receiving, with a layer three (L3) packet-based router coupled to a Cable Modem Termination System (CMTS) that is positioned between a Cable Modem (CM) and the L3 packet-based router, a network packet output by a Customer Premises Equipment (CPE) device of a plurality of CPE devices coupled to the CM and having a first label and a second label appended to the network packet by the CMTS, wherein the first label uniquely identifies the CMTS within a plurality of CMTSs coupled to the L3 packet based-router, wherein the second label uniquely identifies the CPE device of the plurality of CPE devices coupled to the CMTS that output the network packet;

determining, by the L3 packet-based router, at least one subscriber-specific service associated with the CPE device of the plurality of CPE devices based on the first and second labels appended to the labeled network packet by the CMTS, wherein the at least one subscriber-specific service comprises a service associated with the CPE device of the plurality of CPE devices; and applying, by the L3 packet-based router, the at least one subscriber-specific service to the labeled network packet received from the CMTS.

2. The method of claim 1, further comprising:
determining, by the L3 packet-based router, whether the second label matches an association between the second label and a subscriber identifier that uniquely identifies the the CPE device of the plurality of CPE devices that sent the network packet;

when the second label does not match any association, determining, by the L3 packet-based router, the subscriber identifier of the CPE device of the plurality of CPE devices based in part on at least one of a Media Access Control address of the CPE device of the plurality of CPE devices that is associated with the network packet or an authentication credential of the CPE device of the plurality of CPE devices that is associated with the network packet; and generating, by the L3 packet-based router, an association between the subscriber identifier of the CPE device of the plurality of CPE devices and the second label.

3. The method of claim 2, further comprising:
when the second label matches an association between the second label and a subscriber identifier that uniquely identifies the CPE device of the plurality of CPE devices, selecting, by the L3 packet-based router, at least one service definition based at least in part on the subscriber identifier; and in response to selecting the service definition, configuring the L3 packet-based router to apply the at least one subscriber-specific service, wherein the subscriber-specific service is based at least in part on the service definition.

4. The method of claim 3, wherein configuring the L3 packet-based router to apply the at least one subscriber-specific service further comprises:
generating, by the L3 packet-based router, at least one filter associated with the second label; and associating, by the L3 packet-based router, the at least one filter with the subscriber-specific service, such that the L3 packet-based router can apply the subscriber-specific service when the L3 router determines that the second label associated with the network packet matches the filter.

5. The method of claim 1, further comprising:
receiving, by the L3 packet-based router, a request that indicates the CMTS has been coupled to the L3 packet-based router;

determining, by the L3 packet-based router, the first label that uniquely identifies the CMTS within a plurality of CMTSs coupled to the L3 packet based-router;

associating, by the L3 packet-based router, the first label with the Media Access Control address of CPE device that is associated with the request;

determining, by the L3 packet-based router, a group of labels that are usable to uniquely identify CPE devices within a plurality of CPE devices coupled to the CMTS, wherein the group of labels includes the second label; and sending, by the L3 packet-based router, the first label and the group of labels to the CMTS.

6. The method of claim 1, further comprising:
after applying the at least one subscriber-specific service, determining using Longest Prefix Matching, by the L3 packet-based router, a next hop associated with the second label of the network packet; and
forwarding, by the L3 packet-based router, the network packet to the next hop.

7. The method of claim 1, wherein applying the at least one subscriber-specific service to the labeled network packet received from the CMTS includes applying one or more of a deep packet inspection service, a virus detection service, a video conferencing service, a mobile Internet Protocol service, a packet filtering service, network-based printer service, a storage service, or a web conferencing service, to the network packet received from the CPE device of the plurality of CPE devices.

8. The method of claim 7, wherein the subscriber-specific services include at least one service that is not applied by the CMTS.

9. The method of claim 1, wherein the first label and the second label are labels selected from the group consisting of Multiprotocol Label Switching (MPLS) labels, Q-in-Q tags, and Virtual Private Local Area Network Service (VPLS) labels.

10. The method of claim 1, wherein the network packet is not associated with one or more Data Over Cable Service Interface Specification (DOCSIS) headers.

11. The method of claim 1, wherein the first and second labels are appended to the network packet as a label stack of routing labels.

12. A network device comprising:
a control unit having one or more hardware-based microprocessors;
an interface that receives, from a Cable Modem Termination System (CMTS) that is positioned between a Cable Modem (CM) and the network device, a network packet output by a Customer Premises Equipment (CPE) device of a plurality of CPE devices coupled to the CM and having a first label and a second label appended to the network packet by the CMTS, wherein the first label uniquely identifies the CMTS within a plurality of CMTSs coupled to the network device, wherein the second label uniquely identifies the CPE device of the plurality of CPE devices coupled to the CMTS that output the network packet; and
a service module executable by the microprocessors,
wherein the service module determines at least one subscriber-specific service associated with the CPE device of the plurality of CPE devices based on the first and second labels appended to the labeled network packet by the CMTS, wherein the at least one subscriber-specific service comprises a service associated with the CPE device of the plurality of CPE devices, and
wherein the service module applies the at least one subscriber-specific service to the labeled network packet received from the CMTS.

13. The network device of claim 12,
wherein the service module determines whether the second label matches an association between the second label and a subscriber identifier that uniquely identifies the CPE device of the plurality of CPE devices that sent the network packet;
wherein the service module determines, when the second label does not match any association, the subscriber identifier of the CPE device of the plurality of CPE devices based in part on at least one of a Media Access Control address of the CPE device of the plurality of CPE devices that is associated with the network packet or an authentication credential of the CPE device of the plurality of CPE devices that is associated with the network packet; and
wherein the service module generates an association between the subscriber identifier of the CPE device of the plurality of CPE devices and the second label.

14. The network device of claim 13,
wherein the service module selects, when the second label matches an association between the second label and a subscriber identifier that uniquely identifies the CPE device of the plurality of CPE devices, at least one service definition based at least in part on the subscriber identifier; and
wherein the service module configures, in response to selecting the service definition, network device to apply the at least one subscriber-specific service, wherein the subscriber-specific service is based at least in part on the service definition.

15. The network device of claim 14,
wherein the service module generates at least one filter associated with the second label; and
associates the at least one filter with the subscriber-specific service, such that the L3 packet-based router can apply the subscriber-specific service when the L3 router determines that the second label associated with the network packet matches the filter.

16. The network device of claim 12,
wherein the service module receives a request that indicates the CMTS has been coupled to the L3 packet-based router;
wherein the service module determines the first label that uniquely identifies the CMTS within a plurality of CMTSs coupled to the L3 packet based-router;
wherein the service module associates the first label with the Media Access Control address of CPE device that is associated with the request;
wherein the service module determines a group of labels that are usable to uniquely identify CPE devices within a plurality of CPE devices coupled to the CMTS, wherein the group of labels includes the second label; and
wherein the service module sends the first label and the group of labels to the CMTS.

17. The network device of claim 12,
wherein the service module determines, after applying the at least one subscriber-specific service, using Longest Prefix Matching, a next hop associated with the second label of the network packet; and
wherein the service module forwards the network packet to the next hop.

18. The network device of claim 12,
wherein the service module applies one or more of a deep packet inspection service, a virus detection service, a video conferencing service, a mobile Internet Protocol service, a packet filtering service, network-based printer service, a storage service, or a web conferencing service, to the network packet received from the CPE device of the plurality of CPE devices.

19. The network device of claim 18, wherein the subscriber-specific services include at least one service that is not applied by the CMTS.

20. The network device of claim 12, wherein the first label and the second label are labels are selected from the group consisting of Multiprotocol Label Switching (MPLS) labels, Q-in-Q tags, and Virtual Private Local Area Network Service (VPLS) labels.

21. The network device of claim 12, wherein the network packet is not associated with one or more Data Over Cable Service Interface Specification (DOCSIS) headers.

22. A non-transitory computer-readable medium comprising instructions that, when executed, cause one or more processors of a layer three (L3) packet-based router to:
receive, with the L3 packet-based router coupled to a Cable Modem Termination System (CMTS) that is positioned between a Cable Modem (CM) and the L3 packet-based router, a network packet output by a Customer Premises Equipment (CPE) device of a plurality of CPE devices coupled to the CM and having a first label and a second label appended to the network packet by the CMTS, wherein the first label uniquely identifies the CMTS within a plurality of CMTSs coupled to the L3 packet based-router, wherein the second label uniquely identifies the CPE device of the plurality of CPE devices coupled to the CMTS that output the network packet;
determine at least one subscriber-specific service associated with the CPE device of the plurality of CPE devices based on the first and second labels appended to the labeled network packet by the CMTS, wherein the at least one subscriber-specific service comprises a service associated with the CPE device of the plurality of CPE devices; and
apply the at least one subscriber-specific service to the labeled network packet received from the CMTS.

23. A method comprising:
receiving, with a Cable Modem Termination System (CMTS) positioned between a Cable Modem (CM) and a layer three (L3) packet-based router, a Data Over Cable Service Interface Specification (DOCSIS) encapsulated packet from a Customer Premise Equipment (CPE) device coupled to the CM, wherein the DOCSIS-encapsulated packet includes a DOCSIS header that encapsulates a network packet;
processing the DOCSIS-encapsulated packet, with the CMTS, to decapsulate the DOCSIS header from the network packet;
determining, with the CMTS, a first label that uniquely identifies the CMTS within a plurality of CMTSs coupled to the L3 packet-based router;
determining, with the CMTS, a second label that is associated the CPE device of the plurality of CPE devices and uniquely identifies the CPE device of the plurality of CPE devices within a plurality of CPE device coupled to the CMTS;
appending, with the CMTS, the first label and the second label with the decapsulated network packet to generate a labeled network packet; and
forwarding, with the CMTS, the labeled network packet to the L3 packet-based router in accordance with the first label and the second label, such that the L3 packet-based router is capable of applying at least one subscriber-specific service to the labeled network packet based on the first label and the second label.

24. The method of claim 23, further comprising:
in response to determining that the CMTS has coupled to the L3 packet-based router, sending, by the CMTS, a request to the L3 packet based router that indicates the CMTS has coupled to the L3 packet-based router;
receiving, by the CMTS, the first label that uniquely identifies the CMTS within the plurality of CMTSs coupled to the L3 packet based-router; and
receiving, by the L3 packet-based router, a group of labels that are usable to uniquely identify CPE devices within the plurality of CPE devices coupled to the CMTS, wherein the group of labels includes the second label.

25. The method of claim 24, wherein determining the second label further comprises:
determining, by the CMTS, a Media Access Control (MAC) address associated with the network packet, wherein the MAC address is associated with the CPE device of the plurality of CPE devices;
determining, by the CMTS, whether the MAC address associated with the network packet matches a MAC address associated with a label that uniquely identifies the CPE device of the CPE devices within the plurality of CPE devices coupled to the CMTS; and
when the MAC address associated with the network packet does not match a MAC address associated with a label that uniquely identifies the CPE device of the CPE devices within the plurality of CPE devices, generating, by the CMTS, an association between the MAC address of the CPE device and the second label, wherein the second label is not associated with another CPE device in the plurality of CPE devices coupled to the CMTS.

26. The method of claim 25, further comprising:
when the MAC address associated with the network packet matches a MAC address associated with a label that uniquely identifies the CPE device of the plurality of CPE devices, determining, by the CMTS, the label that uniquely identifies the CPE device of the plurality of CPE devices; and
determining, by the CMTS, the label is the second label to associate with the decapsulated network packet to generate a labeled network packet.

27. The method of claim 24, wherein the first label is a Multiprotocol Label Switching (MPLS) label, the method further comprising:
in response to receiving the first label that uniquely identifies the CMTS within the plurality of CMTSs coupled to the L3 packet-based router, generating, by the CMTS, a Label Switched Path (LSP) between the CMTS and the L3 packet-based router, wherein the LSP is associated with the first label.

28. The method of claim 24, wherein forwarding the labeled network packet to the L3 packet-based router in accordance with the first label and the second label further comprises:
determining, by the CMTS, whether an exact match exists between the first label and the LSP; and
when an exact match exists between the first label and the LSP, forwarding, by the CMTS, the labeled network packet using the LSP.

29. The method of claim 23, wherein the first label and the second label are labels select from the group consisting of Multiprotocol Label Switching (MPLS) labels, Q-in-Q tags, and Virtual Private Local Area Network Service (VPLS) labels.

30. The method of claim 23, wherein the CMTS does not apply subscriber-specific services to the labeled network packet based at least in part on the first label and the second label.

31. The method of claim 23, wherein the CMTS does not perform longest prefix matching of a layer-3 network address associated with the network packet to forward the network packet to a next hop.

32. The method of claim 23, wherein the second label uniquely identifies the CPE device of the plurality of CPE devices coupled to the CMTS.

33. A Cable Modem Termination System (CMTS) comprising:
- a control unit having one or more hardware-based microprocessors;
- an interface that receives a Data Over Cable Service Interface Specification (DOCSIS) encapsulated packet from a Customer Premise Equipment (CPE) device coupled to the CM, wherein the DOCSIS-encapsulated packet includes a DOCSIS header that encapsulates a network packet, wherein the CMTS is positioned between a Cable Modem (CM) and a layer three (L3) packet-based router;
- a multiplexing module that processes the DOCSIS-encapsulated packet to decapsulate the DOCSIS header from the network packet;
- a label module that determines a first label that uniquely identifies the CMTS within a plurality of CMTSs coupled to the L3 packet-based router,
  - wherein the label module determines a second label that is associated the CPE device of the plurality of CPE devices and uniquely identifies the CPE device of the plurality of CPE devices within a plurality of CPE device coupled to the CMTS,
    - wherein the label module appends the first label and the second label with the decapsulated network packet to generate a labeled network packet; and
- a forwarding engine that forwards the labeled network packet to the L3 packet-based router in accordance with the first label and the second label, such that the L3 packet-based router is capable of applying at least one subscriber-specific service to the labeled network packet based on the first label and the second label.

34. The CMTS of claim 33,
- wherein the label module sends, in response to determining that the CMTS has coupled to the L3 packet-based router, a request to the L3 packet based router that indicates the CMTS has coupled to the L3 packet-based router;
- wherein the label module receives the first label that uniquely identifies the CMTS within the plurality of CMTSs coupled to the L3 packet based-router; and
- wherein the CMTS receives a group of labels that are usable to uniquely identify CPE devices within the plurality of CPE devices coupled to the CMTS, wherein the group of labels includes the second label.

35. The CMTS of claim 34,
- wherein the label module determines a Media Access Control (MAC) address associated with the network packet, wherein the MAC address is associated with the CPE device of the plurality of CPE devices;
- wherein the label module determines whether the MAC address associated with the network packet matches a MAC address associated with a label that uniquely identifies the CPE device of the CPE devices within the plurality of CPE devices coupled to the CMTS; and
- wherein the label module generates, when the MAC address associated with the network packet does not match a MAC address associated with a label that uniquely identifies the CPE device of the CPE devices within the plurality of CPE devices, an association between the MAC address of the CPE device and the second label, wherein the second label is not associated with another CPE device in the plurality of CPE devices coupled to the CMTS.

36. The CMTS of claim 35,
- wherein the label module determines, when the MAC address associated with the network packet matches a MAC address associated with a label that uniquely identifies the CPE device of the plurality of CPE devices, the label that uniquely identifies the CPE device of the plurality of CPE devices; and
- wherein the label module determines the label is the second label to associate with the decapsulated network packet to generate a labeled network packet.

37. The CMTS of claim 34,
- wherein the label module generates, in response to receiving the first label that uniquely identifies the CMTS within the plurality of CMTSs coupled to the L3 packet-based router, a Label Switched Path (LSP) between the CMTS and the L3 packet-based router, wherein the LSP is associated with the first label.

38. The CMTS of claim 34,
- wherein the label module determines whether an exact match exists between the first label and the LSP; and
- wherein the forwarding engine forwards the labeled network packet using the LSP.

39. The CMTS of claim 33, wherein the first label and the second label are labels selected from the group consisting of Multiprotocol Label Switching (MPLS) labels, Q-in-Q tags, and Virtual Private Local Area Network Service (VPLS) labels.

40. The CMTS of claim 33, wherein the CMTS does not apply subscriber-specific services to the labeled network packet based at least in part on the first label and the second label.

41. The CMTS of claim 33, wherein the CMTS does not perform longest prefix matching of a layer-3 network address associated with the network packet to forward the network packet to a next hop.

42. The CMTS of claim 33, wherein the second label uniquely identifies the CPE device of the plurality of CPE devices coupled to the CMTS.

43. A non-transitory computer-readable medium comprising instructions that, when executed, cause one or more processors of a Cable Modem Termination System (CMTS) to:
- receive a Data Over Cable Service Interface Specification (DOCSIS) encapsulated packet from a Customer Premise Equipment (CPE) device coupled to the CM, wherein the DOCSIS-encapsulated packet includes a DOCSIS header that encapsulates a network packet, wherein the CMTS is positioned between a Cable Modem (CM) and a layer three (L3) packet-based router;
- process the DOCSIS-encapsulated packet to decapsulate the DOCSIS header from the network packet;
- determine a first label that uniquely identifies the CMTS within a plurality of CMTSs coupled to the L3 packet-based router;
- determine a second label that is associated the CPE device of the plurality of CPE devices and uniquely identifies the CPE device of the plurality of CPE devices within a plurality of CPE device coupled to the CMTS;
- append the first label and the second label with the decapsulated network packet to generate a labeled network packet; and
- forward the labeled network packet to the L3 packet-based router in accordance with the first label and the second label, such that the L3 packet-based router is capable of applying at least one subscriber-specific service to the labeled network packet based on the first label and the second label.

44. A network system comprising:
- a network that includes:

a plurality of Cable Modem Termination System (CMTSes);

a layer three (L3) packet-based router that is coupled to the plurality of CMTSes, wherein one of the plurality of CMTS is positioned between a Cable Modem (CM) and the L3 packet-based router and includes:

an interface that receives a Data Over Cable Service Interface Specification (DOCSIS) encapsulated packet from a Customer Premise Equipment (CPE) device coupled to the CM, wherein the DOCSIS-encapsulated packet includes a DOCSIS header that encapsulates a network packet;

a control unit that processes the DOCSIS-encapsulated packet to decapsulate the DOCSIS header from the network packet, determine a first label that uniquely identifies the one of the plurality of CMTSs coupled to the L3 packet-based router, determine a second label that is associated the CPE device of the plurality of CPE devices and uniquely identifies the CPE device of the plurality of CPE devices coupled to the CMTS and appends the first label and the second label with the decapsulated network packet to generate a labeled network packet, and a forwarding engine that forwards the labeled network packet to the L3 packet-based router in accordance with the first label and the second label; and wherein the L3 packet-based router includes:

an interface that receives the labeled network packet; and a control unit that determines at least one subscriber-specific service associated with the one of the plurality of CPE devices based on the first and second labels appended to the labeled network packet, wherein the at least one subscriber-specific service comprises a service associated with the one of the plurality of CPE devices and applies the at least one subscriber-specific service to the labeled network packet.

* * * * *